May 31, 1938. W. J. MORRISSEY 2,118,894
APPARATUS FOR PRODUCING COMBINED SOUND AND MOTION PICTURE FILMS
Filed Dec. 12, 1934
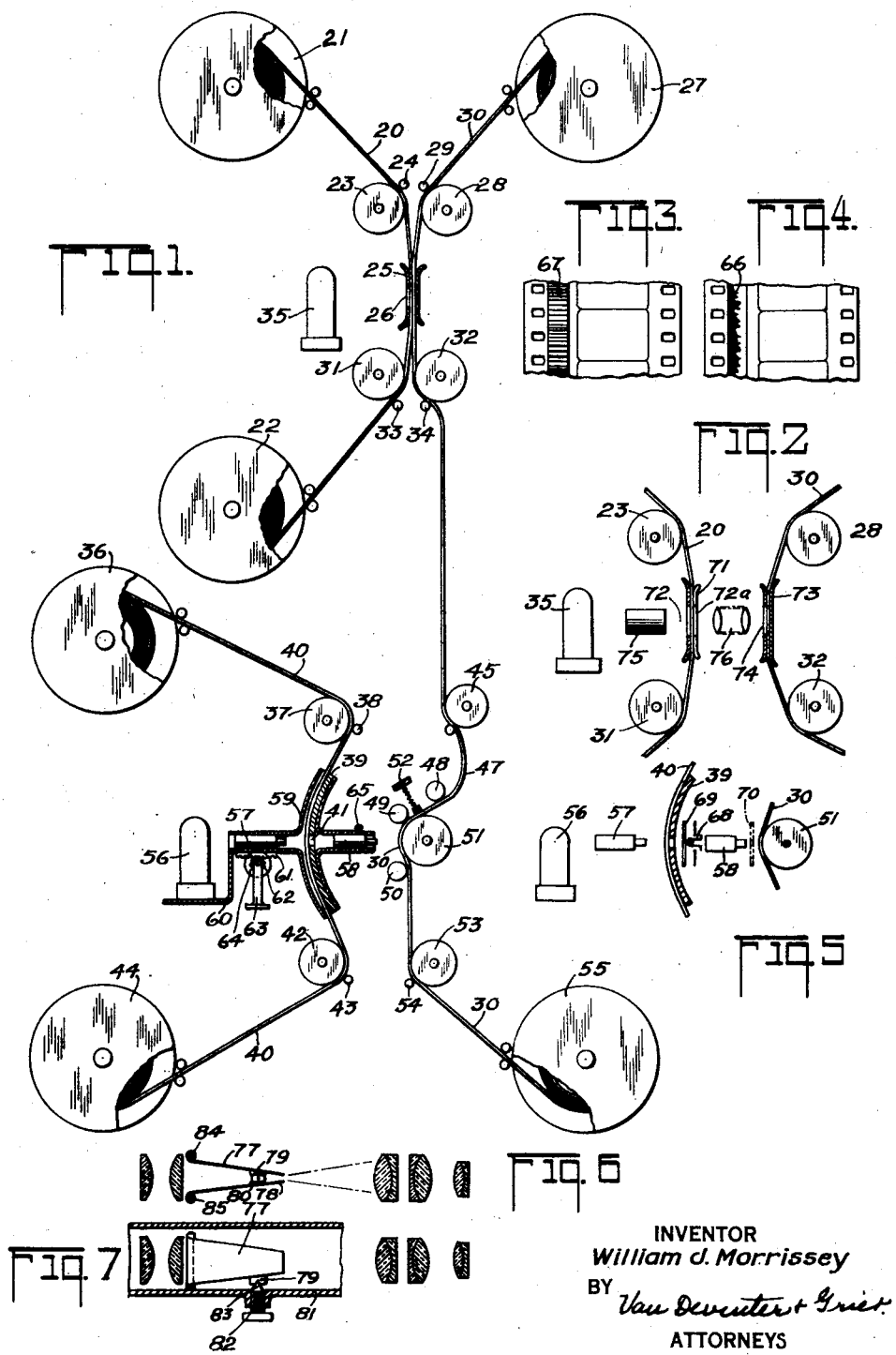
INVENTOR
William J. Morrissey
BY
ATTORNEYS Patented May 31, 1938

2,118,894

UNITED STATES PATENT OFFICE 2,118,894

APPARATUS FOR PRODUCING COMBINED SOUND AND MOTION PICTURE FILMS

William J. Morrissey, Brooklyn, N. Y.

Application December 12, 1934, Serial No. 757,131

11 Claims. (Cl. 88—24)

This invention relates to improvements in apparatus for producing combined sound and motion picture films, and is directed more particularly to an apparatus for recording a sound track on a positive print by means of a series of light bands or variations thereof, controlled by the frequency of the sound record negative.

A further object of the invention is the provision, in a film printing device, of instrumentalities for recording sound tracks directly on composite positive, under control of a previously recorded sound record. This recording may differ from the master record in form and dimension, but its frequency will be identical with that of the master record.

Another object of the invention is the provision in a film printing device, of instrumentalities including a light modulating device whereby, in recording a sound track directly on positive film according to the new and improved method, a monitor may rectify irregularities in density occurring in the master sound record controlling said recording.

Still another object of the invention is the provision of a film printing device adapted to print or photograph pictures on a film strip in accordance with a master film, and adapted to record on said film strip light variations modulated by a master sound film, and including other light modulating means through which further monitoring control may be effected, regardless of the density of the master sound record.

Another object of the invention is the provision of a film printing device adapted to print or photograph pictures on positive film stock by the usual methods and adapted to record a variable density sound track on the same positive resembling the sound negative or master film in frequency. For example, the sound track on the master film may be either a variable area track or a variable density track. The new and improved device will record a variable density track on the positive stock regardless of whether the sound negative is variable area or variable density.

Heretofore, in printing sound tracks on positive film the printing light spans a substantial portion of the sound track on the negative or master film and as the positive and the negative are together advanced through the printing machine the sound track is exposed to different portions of the printing light at different angularities therefore making it impossible to obtain a clean, sharp positive print.

Furthermore, the grain of the negative affects the positive print as do changes of density and gamma. All irregularities and errors of recording appearing on the negative are reproduced on the positive, and irregularities of motion due to mechanical errors in the mechanism, the slippage of the negative relative to the positive and the changes due to shrinkage further prevent the sound track on the positive film from being clear cut and sharp.

All of these difficulties are overcome by applicant's new and improved method of recording the sound track under control of the sound negative but resembling it only in frequency. Where the sound negative is of variable density the striations each individually act as mechanical shutters for light emerging from the first optical unit. The second optical unit gathers the light which is permitted to pass thereto and records the same on the positive in a series of striations. Where the negative has a variable area track, the area meters the quantity of light passing through the sound negative, and the second optical unit gathers the light which is permitted to pass thereto and records the same on the positive in a series of striations.

A further object of the invention is the provision of additional filtering applied to both the negative and to the positive stock thereby eliminating defects caused by irregularities between the upper and lower feeding sprockets.

Another object of the invention is the provision, in a device for recording sound tracks and employing two optical units, of a screen between the master film and the second optical unit for modifying light passing through said master film, thereby further changing the character of the recording on the positive.

Still another object of the invention is the provision; in a device for recording sound tracks and employing an exciting lamp, two optical units, and a light valve interposed between the master film and the second optical unit; of a screen or filter positioned between the second optical unit and the positive for changing the characteristics of the combined light passing to the latter from the master film and from the light valve.

Other objects of the invention will be apparent to those skilled in the art.

Referring to the drawing,

Figure 1 is a diagrammatical sketch showing the path taken by the positive stock, the path taken by the picture negative, and the path taken by the sound negative in the new and improved printing and recording device;

Figure 2 shows a modification of the picture printing portion of the device in which the positive stock is printed by projection instead of by contact as shown in Figure 1;

Figure 3 is a portion of film showing a portion of variable density sound track;

Figure 4 is a portion of a film showing a portion of a variable area sound track;

Figure 5 is a diagrammatical sketch showing a modified form of the invention in which a light valve is positioned between the master film and the second optical unit and in which color screens may be positioned, (1) between the master film and the second optical unit, and (2) between the second optical unit and the positive stock;

Figure 6 is a sectional view showing an optical device such as is shown in the co-pending application herein referred to; and Figure 7 is a sectional diagrammatic view showing an arrangement for varying the width of the slit.

This application is a continuation in part of application, Serial Number 674,127, filed, June 3, 1933.

The present methods of recording or re-recording audible frequencies photographically are usually divided into three general classifications:

1. Variable area,
2. Glow tube type of variable density, and
3. Light-valved type of variable density.

Optical printers have long been a source of considerable trouble and with the advent of frequency tracks on the same film with the motion picture, the defects in the present methods of printing are further amplified.

The inaccuracies of gear ratios, the backlash of gears for driving positive and negative materials, the crawling of the negative relative to the positive or vice versa, together with film shrinkage makes it difficult to obtain positive prints having sound tracks in which there is a minimum of attenuation of the higher frequencies caused mainly by positive print blurring.

In the present invention, frequencies are translated from the negative or master sound track to the positive and the invention is a recorder in every respect.

By positioning a second optical unit between the master film or negative and the positive stock all semblance of control by the first optical unit is deleted with the exception of the frequency of the sound track on the master film.

If the sound track on the master is of variable density form, the bands or striations act as a series of shutters which mechanically interrupt the light passing to the second optical unit; or if the sound track on the master is of variable area form it meters the quantity of light passing to the second optical unit. In either case the second optical unit gathers the modulated light which passes through the master film and records a sound track in a series of bands or striations on the positive. Therefore, the master film becomes, in effect, a light modulator.

The slit in the second or recording optical unit is preferably parallel to the slit in the first or reading optical unit. The optical units may be of any known form and may have mechanical or optical "slits", however, in the preferred embodiment of the invention optical units such as the type shown in co-pending application Serial Number 697,377, filed November 10, 1933, which includes two surfaces angularly disposed to each other and have right angular ends which provide a slit aperture having perfectly smooth edges, have been found preferable.

To further control the density of the resultant positive, the closely adjacent ends of the metallic strips forming the slit may be made adjustable relative to each other so that the width of the slit may be varied in any desirable manner. For example, the slit in the first optical unit (the one scanning the negative record film) may be set to form a wider slit than that of the slit in the second or recording optical unit; the slits in both the reading and the recording optical unit may be set for the same width; or the slit in the recording optical unit may be of greater width than that of the reading optical unit. It is preferable that these settings be of not greater width than that of the narrowest striations in the sound track of the negative, however.

From this it can be seen that the recorded sound track on the positive may be of the same frequency as that of the negative sound track and yet the ratios of the white and black areas in the positive may be varied throughout substantially wide limits without changing the frequency.

Throughout this specification the term "reading optical unit" is understood to be the first optical unit, or the unit which scans the master film or any film used to control the recording of sound on a positive. While the term "recording optical unit" refers to the second optical unit, or the unit positioned between the film to be recorded on and the film employed to modulate the recording light.

By providing the device with a modulated light valve between the master film and the recording optical unit, other recordings may be superimposed upon the recording on the composite positive. For example, the master film may be a record of a man reciting a piece of poetry. By modulating the light valve by means of a second master film through a photo-electric cell and a suitable amplifier, or by modulating directly through a microphone and amplifier, suitable incidental music may be recorded on the positive along with the recitation. This opens up possibilities for many useful, pleasing and novel effects and variations of the final recording.

By positioning a screen of suitable color between the master film and the recording optical unit the actinic value of the light passing to the recording optical unit may be altered, thereby changing the resultant sound level or gamma of the positive. In cases of combinational recording such as above mentioned the intensity of the actinic value of light passing to the recording optical unit from the master film may be made less than the actinic value of light emanating from the light valve with the result that from the resultant positive the reproduced sound, which was recorded by the master film, would be less intense than that recorded by the light valve.

As a further variation the color screen may be placed between the recording optical and the positive and thereby affect the character of the combination of both the light modulations from the light valve and from the master film.

Referring to Figure 1 which is diagrammatic, the picture negative 20 is carried on a reel 21 and a suitable takeup reel 22 is provided to take up the picture negative as the printing progresses. The negative, leaving the reel 21, passes over a sprocket or roller 23 and is held in contact therewith by a small roller 24. Leaving the roller 23, the negative passes through a film gate 25 which is provided with an aperture 26. A reel 27 carries positive stock 30 which passes over a roller 28 and is held in operative relation therewith by the small roller 29. The positive leaving the roller 28 also passes through the film gate 25 in contact with the picture negative 20.

The picture negative 20 leaving the film gate 25 is propelled by the roller 31 and is held into operative relation to the same by the small roller 33, and the positive stock 30 is propelled by the roller 32 being held in contact therewith by the small roller 34.

The picture negative 20 is taken up on the take-up reel 22. A suitable printing lamp 35 is positioned in line with the aperture 26 in the film gate and as the negative and the positive pass through the film gate light from this lamp prints the picture on the positive. The aperture 26 is of such size that a portion of the positive between the picture and one row of sprocket holes is left unexposed so that the sound track for producing sound to accompany the picture may be printed thereon.

The sound negative 40 is carried on a reel 36 and passes over a roller 37. A small roller 38 keeps the sound negative 40 in contact with the roller 37. After leaving the roller 37, the sound negative 40 passes over a curved plate 39 having an aperture 41 formed therein. A roller 42 propels the negative 40 over this curved plate 39 and a suitable takeup reel 44 takes up the negative as the recording progresses. A suitable small roller 43 keeps the negative 40 in contact with the roller 42.

The positive 30 leaving the roller 32 passes over the roller 45 and is held in contact therewith by a suitable small roller 46 and is formed into a loop 47. The positive then passes between three rollers 48, 49 and 50 and a large roller 51. The length of positive between the roller 32 and the roller 45 may be in the form of a loop to provide further filtering, and impulses due to mechanical irregularities may be effected by one or more suitable restraining members 52. The positive stock leaving the roller 51 passes between the large roller 53 and the small complementary roller 54, after which it is taken up on the takeup reel 55.

An exciting lamp 56 is provided for recording the sound track on the positive. An optical unit 57, which may be termed a reading optical unit, is positioned between the exciting lamp and the sound negative 40 a fixed distance away from the picture negative and the curved plate 39 in line with the aperture 41. A second optical unit 58, which may be termed a recording optical unit, is positioned between the sound negative 40 and the positive stock 30.

It has been found preferable to mount the optical units 57 and 58, the exciting lamp 56 and the curved plate 39 in fixed relation to each other in a casing such as that designated by the numeral 59 so that the entire assembly may be adjusted relative to the positive stock 30 where it passes over the roller 51. The casing 59 has a bracket 60 for supporting the exciting lamp 56 and is provided with a rack 61 which meshes with a pinion 62 carried by a suitable support 63 in the frame of the machine (not shown). By turning a knurled knob 64 the casing containing the entire assembly may be moved relative to the roller 51. The casing 59 is provided with a set screw 65 for fixing the recording optic 58 relative to the film 40 passing over the curved plate 39.

When the parts are being assembled it is necessary to adjust the optic 58 relative to the sound negative 40 passing over the curved plate 39 and once the setting is made the optic 58 may be permanently secured relative to the rest of the assembly, after which the whole assembly may be moved relative to the positive stock 30 passing over the roller 31 for the purposes of focusing the slit of the recording optical unit on the positive.

The optical units 57 and 58 may be any of the usual well known types in which the light emerging therefrom is of rectangular form and having a width greater than its height. In the present invention it has been found preferable to use optical assemblies such as that shown and described in co-pending application Serial Number 679,377, filed November 10, 1933, now Patent No. 2,031,971, dated February 25, 1936, in which the form of the emergent beam is controlled by two oppositely disposed inclined planes, such as is shown in Figure 6, one of which is designated by the numeral 77 and the other by the numeral 78. These inclined planes are provided with extensions 79 and 80 respectively.

The inclined plane 77 is secured to a fixed support 84 and the inclined plane 78 is secured to a fixed support 85, the opposite ends of the inclined planes meeting on the center line of the optical unit. The barrel 81, containing the optical assembly, is provided with a screw 82 having a conical point 83. This screw is centrally located relative to the optical axis of the assembly and when it is screwed in the conical point 83 engages the extensions 79 and 80 and moves the inclined planes apart. As the screw is centrally located the planes will be moved equal distances on their respective sides of the optical axis of the assembly and thereby the optical slit may be set at any desired width.

It is obvious that many different forms of mechanism may be devised for moving the planes 77 and 78 relative to the optical axis and this invention is not limited to the specific means shown.

In recording on positive stock by the herein disclosed method, blurs due to slippage of the positive relative to the negative in the old methods are eliminated, the grain of the film containing the negative sound track is not transmitted to the positive print and even the character of the recording on the negative may be changed. For example, the sound negative may have a variable area sound track such as that shown at 66 in Figure 4, and the resultant sound track recorded on the positive will be a variable density sound track such as that shown at 67 in Figure 3. Furthermore, the relative black and white areas of the striations may be varied, as above pointed out, without changing the frequency of the resultant positive sound track.

In other words, in the new and improved device the sound negative 40 controls the frequency of the sound track being recorded on the positive.

With this in view, many new effects heretofore unknown in the art may be produced.

Referring to Figure 5, a light valve 68 is positioned between the sound negative and the recording optical unit 58. With the light valve 68 controlled by a microphone and a suitable amplifier, or any other sound controlled device, a second series of sound may simultaneously be recorded on the positive 30 at the same time the frequency of the sound negative 40 is recorded. In this case, the recording will be the combination of the two sets of sounds. An example of such a recording would be where a person is talking and it is desired to introduce a light musical background. Assuming that the sound negative 40 records the speech the musical background would be recorded by the light valve.

Further effects may be obtained by introducing a screen 69 between the sound negative 40 and the light valve 68. This screen may be of any desired color and may be provided to reduce the actinic value of light emerging from the sound negative thereby altering that portion of the recording.

As a further modification, a screen may be provided between the recording optical unit and the positive thereby changing the actinic value of all of the light falling upon the positive stock 30.

Further effects may be had by having the screens tapering. A tapering screen may be made in several ways, one of which is to have the color deepen from the edge to the center and another, to have a series of color bands each of which blends into the other.

While the drawing is merely schematic it is understood that the various rollers for feeding the negative and the positive film are positively driven in timed relation to each other by suitable well known gearing and mechanism and it is understood that every precaution is taken to eliminate and filter out from the films the irregularities of motion due to the mechanism.

In the arrangement shown in Figure 2 the picture negative 20 passes through a film gate 71 which is provided with double apertures 72 and 72a and the positive stock 30 passes through a film gate 73 provided with an aperture 74. The film gates 71 and 73 are spaced apart from each other and a suitable lens 76 is positioned therebetween for optically projecting images from the picture negative 20 to the positive stock 30. A suitable condensing lens 75 may be, if desired, positioned between the printing lamp 35 and the picture negative 20. In this arrangement the positive stock 30, after passing through the film gate 73 passes to the rollers 45, 51 and 53 and on to the takeup reel 55 and while the film is passing over the roller 51, the sound track is recorded thereon.

It will be obvious from the foregoing that the method herein disclosed may be used for producing a sound record on photo-sensitive film by providing a primary sound record such as that shown at 40 in Figure 1 and a blank such as 30 adapted to have a sound record optically impressed thereon and that said record and blank are moved in definite timed relation to each other. The record is then scanned with a beam of light from the lamp 56 through the reading optical unit 57 and the beam of light emerges from 57 modulated by the movement of the record 40 therethrough. Obviously, this modulation can be brought about by reflecting the light from the record in a manner well understood by those skilled in the art.

The beam of light, after it has been reflected from or has passed through the record 40 and is modulated thereby, is optically reformed by the recording optical unit 58 and is then projected onto the blank 30, thereby recording the sound on said blank to produce the sound record.

If it is desired to produce a sound and motion picture film, the pictures are photographed thereon by contact printing as shown in the upper portion of Figure 1 or optically as shown in Figure 2, and the sound is impressed on the film 30 as just described so that the film 30 carries both the sound track and pictures.

It will be observed that the sound record is not produced on the film 30 by contact printing. It is optically recorded thereon.

The film 20 may be termed the primary picture record. The film 40 may be termed the primary sound record. It is obvious that the primary picture record and the primary sound record may be on the same film, but in that event the pictures only are photographed onto the combined sound and picture film—or positive print 30—a loop of the primary or negative film in this case being taken out and run through the sound recording mechanism shown in the lower portion of Figure 1. As such modifications are obvious, they are not herein described in detail.

All of the apparatus shown in Figure 1 may be mounted in a single unitary structure so that the various rollers for feeding the negative picture (20) and positive film stock (30) and sound record (40) are positively driven in timed relation to each other and such arrangement provides a convenient means for making positive prints in a single apparatus that will handle both the printing of the picture and the re-recording of sound on the positive print, in accordance with the invention herein described and claimed.

Although simple diagrammatic embodiments of the invention are herein described and shown, it is obvious that the apparatus described and shown is illustrative of the invention and many devices may be constructed by those skilled in the art without departing from the spirit of the invention as defined in the following claims.

What is claimed is:

1. In a device for producing sound records, a primary sound record, a strip of positive film, a curved plate having an aperture formed therein, a roller spaced apart from said plate and having its axis substantially at right angles to said aperture, means for moving said record over said curved plate and said film over said roller in definite timed relation to each other, an exciting lamp, a reading optical unit including optical slit forming means between said lamp and said record, said lamp, said optical unit, and said record constituting a source of modulated light, and a recording optical unit similar to said first unit between said record and the positive film, with its optical slit-forming means focused on said film and solely defining the dimensions of the recording, said reading optical unit determining the frequency of said recording only.

2. In a device for producing sound records, a sound negative, a strip of positive film, a curved plate having an aperture formed therein, a roller spaced apart from said plate and having its axis substantially at right angles to said aperture, means for moving said negative over said curved plate and said film over said roller in definite timed relation to each other, a casing embracing said plate and having tubular extensions in line with the aperture in said plate, a bracket secured to one of said tubular extensions, an exciting lamp supported by said bracket, an optical unit in said tubular extension between said lamp and said aperture, a second optical unit in said other tubular extension between said aperture and the positive, means for adjusting said second optical unit relative to said aperture, and means for adjusting said casing and parts carried thereby relative to said positive film.

3. In a device for producing sound records, a sound negative, a strip of positive film, an apertured plate, a roller spaced apart from said plate and having its axis substantially at right angles to said aperture, means for moving said negative over said plate and said film over said roller in definite timed relation to each other, an exciting lamp, a reading optical unit between said lamp and said negative, a recording optical unit between said negative and the positive, said optical units being substantially in line with the aperture in said plate, a light valve positioned between said negative and said recording unit, and means for modulating said light valve.

4. In a device for producing sound records, a primary sound record, a strip of positive stock, an apertured plate, a roller spaced apart from said plate and having its axis substantially at right angles to said aperture, means for moving said record along the surface of said plate and said stock on said roller in definite timed relation to each other, an exciting lamp, a reading optical unit between said lamp and said record, a recording optical unit between said record and the positive, said optical units being substantially in line with the aperture in said plate, a light valve positioned between said record and said recording optical unit, means for modulating said light valve, and a screen positioned between said record and said light valve.

5. A device according to claim 1 in which the optical slit-forming means in said optical units are each comprised of a pair of metallic plates angularly disposed to each other and having squared ends defining the area of light passing therethrough.

6. A device according to claim 1 in which the optical slit-forming means in said optical units are each comprised of a pair of metallic plates angularly disposed to each other and having squared adjacent ends defining the area of light passing therethrough, and in which means is provided for moving said plates equally on either side of the center axis of the optical unit whereby the areas of said slits may be varied thereby changing the proportional areas of light and dark striations recorded on the positive without changing the frequency of the recorded sound.

7. In a device for producing records, a primary record having sound striations, a strip of positive film, means for moving said record and said film in timed relation to each other, an exciting lamp, a beam defining unit positioned between said lamp and said record, including a pair of plates having flat surfaces and squared ends supported at an acute angle relative to each other with adjacent squared ends forming a slit, a second like beam defining unit positioned between said record and said positive film, with the image of said slit focused upon said film, and means in said units cooperating with said plates for moving said squared ends relative to each other, whereby the areas of the light and dark striations on the positive may be adjusted as desired at the same time keeping the frequency of said positive the same as that of the record.

8. In a device for producing sound records, a primary sound record, a strip of positive film, a supporting member for said primary record having a light passage extending therethrough, a roller spaced apart from said plate and having its axis substantially at right angles to said passage, means for moving said record over said supporting member and said film over said roller in definite timed relation to each other, an exciting lamp, a reading optical unit including optical slit-forming means, between said lamp and said record, said lamp, said optical unit, and said record constituting a source of modulated light, and a recording optical unit similar to said first unit between said record and the positive film, with its optical slit-forming means focused on said film and solely defining the dimensions of the recording, said reading optical unit determining the frequency of said recording only.

9. In a device for producing sound records, a primary sound record, a strip of positive film, two members having curved surfaces forming supports for said record and said film, means forming a light passage through one of said members, means for moving said record over one of said surfaces and said film over the other of said surfaces in definite timed relation to each other, an exciting lamp, a reading optical unit including optical slit-forming means between said lamp and said record, said lamp, said optical unit, and said record constituting a source of modulated light, and a recording optical unit similar to said first unit between said record and the positive film, with its optical slit-forming means focused on said film and solely defining the dimensions of the recording, said reading optical unit determining the frequency of said recording only.

10. In a device for producing sound records, a primary sound record, a strip of positive film, a curved supporting member having a light passage formed therein, a curved imperforate member spaced apart from said first member, said members having film-engaging surfaces spaced apart from and in line with each other, means for moving said record over said first member and said film over said second member in definite timed relation to each other, an exciting lamp, a reading optical unit including optical slit-forming means between said lamp and said record, said lamp, said optical unit, and said record constituting a source of modulated light, and a recording optical unit similar to said first unit between said record and the positive film, with its optical slit-forming means focused on said film and solely defining the dimensions of the recording, said recording optical unit determining the frequency of said recording only.

11. In a device for producing sound records, a primary sound record, a strip of positive film, a curved supporting member having a light passage formed therein, a curved imperforate member spaced apart from said first member, said members having film-engaging surfaces spaced apart from and in line with each other, means for moving said record over said first member and said film over said second member in definite timed relation to each other, an exciting lamp, a reading optical unit including optical slit-forming means between said lamp and said record, said lamp, said optical unit, and said record constituting a source of modulated light, and a recording optical unit similar to said first unit between said record and the positive film, with its optical slit-forming means focused on said film and solely defining the dimensions of the recording, said reading optical unit determining the frequency of said recording only, both said slit-forming means being spaced apart from said curved supporting members.

WILLIAM J. MORRISSEY.